United States Patent [19]

Schultz

[11] 3,980,932

[45] Sept. 14, 1976

[54] ELECTRICAL SERVICE CENTER WITH PANEL-MOUNTED CIRCUIT CONNECTORS

[75] Inventor: Robert L. Schultz, Tecumseh, Mich.

[73] Assignee: Modular Circuitry Inc., Tecumseh, Mich.

[22] Filed: Feb. 10, 1975

[21] Appl. No.: 548,532

Related U.S. Application Data

[63] Continuation of Ser. No. 303,178, Nov. 2, 1972, abandoned.

[52] U.S. Cl. .............................. 317/120; 200/51 R; 339/95 D

[51] Int. Cl.[2] ........................................... H02B 1/08

[58] Field of Search ...................... 200/51 R, 51.11; 248/27; 317/112, 120; 339/95 D, 113 L, 126 R, 217 S; 174/94 R

[56] References Cited

UNITED STATES PATENTS

| | | | |
|---|---|---|---|
| 2,660,679 | 11/1953 | Hunt | 339/113 L |
| 2,797,337 | 6/1957 | Hollins | 200/51 R |
| 3,278,880 | 10/1966 | Lewis et al. | 174/94 R |
| 3,361,938 | 1/1968 | Watson | 317/120 |
| 3,436,602 | 4/1969 | Bassani | 317/112 |
| 3,796,987 | 3/1974 | Kinkard | 339/95 D |
| 3,873,174 | 3/1975 | Horeckey | 339/95 D |

*Primary Examiner*—Gerald P. Tolin
*Attorney, Agent, or Firm*—Thomas N. Young

[57] ABSTRACT

An electrical connector device comprising one or more conductive metal connector elements and a two part insulator block having one or more parallel, longitudinal passages to accommodate therein the connector elements. Each connector has crimping ears on one end and a tubular barrel with locking barbs on the other end so as to permit one wire to be mechanically crimped into position and the other wire to be simply plugged in without use of any additional add-on device. The subject device is especially adapted for mounting on a circuit breaker panel so as to permit the individual circuit breakers to be prewired to individual connector devices. This permits actual wiring of the circuit breaker box to the external cables by a simple and secure plug-in operation.

3 Claims, 3 Drawing Figures

ELECTRICAL SERVICE CENTER WITH PANEL-MOUNTED CIRCUIT CONNECTORS

This is a continuation, of application Ser. No. 303,178, filed Nov. 2, 1972, now abandoned.

INTRODUCTION

This invention relates to electrical connectors for solid-wire conductors and particularly to a connector which permits the prewiring of electrical circuit breaker panels and the like.

BACKGROUND OF THE INVENTION

The process of providing electrical wiring between various common electrical devices, such as switches, outlets, and light fixtures and circuit breaker panels typically involves the making of conductive joints or splices between the various segments of wire or cable which are used. A typical residential wiring job involves a large number of such joints between the solid wire conductors of a multiconductor cable of the type known to the trade as ROMEX. According to the prior art, one way to accomplish such an electrical interconnection is to remove the insulation from a length of each wire adjacent the end thereof, wrap the two wires together and cover them with a twist-on connector and/or electrical tape. This type of interconnection is regarded as a very low grade splice and is often outlawed by residential and industrial wiring codes. Another prior art technique for accomplishing an electrical interconnection involves the use of a conductive metal connector which is crimped over each of the two wires to be joined so as to act as a bridge therebetween. The metal connector and the bare wires which are joined thereby may be then suitably incapsulated or taped so as to provide an insulative cover.

Still a third prior art technique involves the fabrication of a multipart connector device having male and female conductive elements of such complex structure as to permit them to be mechanically secured together. These elements are connected, such as by crimping, to the conductors to be joined. The male and female connector elements are then plugged into one another by way of an insulator block which is designed to accommodate the conductive elements therein and to allow them to be selectively connected and disconnected. While such devices are typically effective in operation and facilitate both connection and disconnection, such devices are relatively complicated and expensive to manufacture and do not effect any cost or time savings in an electrical wiring operation.

BRIEF SUMMARY OF THE INVENTION

In accordance with the present invention, an electrical connector is provided which affords the advantages of effecting a permanent connection between each of two or more solid-wire conductors by way of a single metallic connector element which is disposed in an insulator block. The connector element is conveniently connectible to one of the two solid-wire conductors by means of a crimping operation and is quickly and easily secured to the second wire by means of a simple bare-wire plug-in operation. In general, the invention comprises a connector including a single metallic connector element of generally elongate and preferably cylindrical configuration, one end of the connector being adapted for crimping around a bare solid-wire conductor and the other end being adapted to receive and automatically lock against removal another solid, bare wire conductor. One or more of the connector elements is adapted to be permanently disposed in an insulative block having one or more passages formed between the ends thereof so as to receive the connector element or elements. Typically, the interior of the passage is formed with suitable shoulders and the connector formed with suitable spring-lock tabs so that once the connector element with the first wire crimped thereto is disposed in place, it cannot be removed. The second and additional wires are then simply plugged in to complete the permanent electrical connection.

In the preferred form, the subject connector comprises an insulator block adapted to accommodate at least three and, preferably, four of the connector elements so as to permit the simultaneous connection of all wires in a multiwire cable or conductor especially of the type commonly known as ROMEX. In accordance with a preferred feature of the invention, tactile indicia are provided around one of the insulator block sections adjacent the plug-in end so as to distinguish the plug-in apertures from one another. This advises the electrician or workman which of the various solid-wire conductors in the ROMEX cable to insert into the various plug-in apertures of the connector device.

The subject invention provides various other secondary but important features including ease of manufacture and assembly as will hereinafter become apparent.

In accordance with a further feature of the present invention, substantial cost savings and convenience may be realized by use of the subject connector in prewiring an electrical circuit breaker panel or the like. In general, this is carried out by mounting one or more of the subject connectors in suitable means, such as apertures, in the electrical circuit panel housing and prewiring respective connector elements to individual circuit breaker devices. This permits the prewired circuit breaker devices to be later individually connected to respective household circuits, for example, simply by plugging in the ROMEX assigned to that circuit into the selected connector element.

DETAILED DESCRIPTION OF THE SPECIFIC EMBODIMENT

Figure 1:
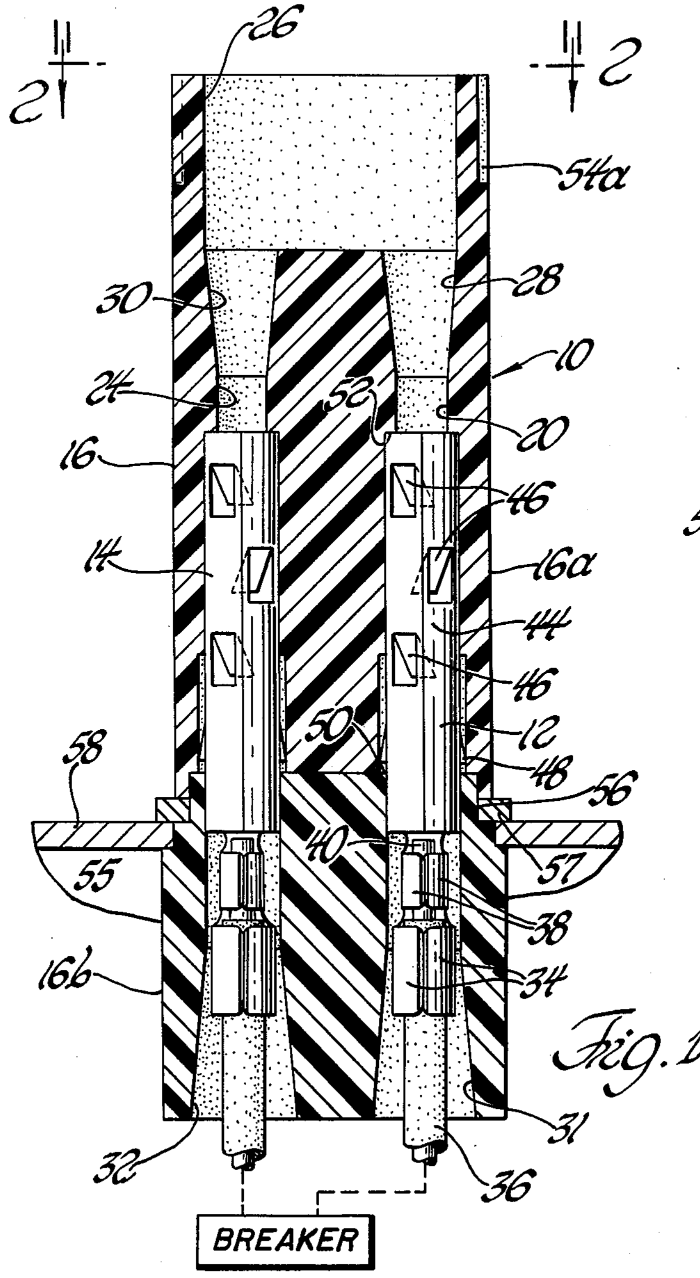
FIG. 1 is a cross sectional view of an illustrative embodiment to the invention as employed in a circuit breaker panel.

Looking to the FIGURES there is shown a connecting device 10 for accomplishing a conductive joint between each of several solid-wire conductors in a pair of multi-conductor cables. Connecting device 10 comprises a plurality of conductive metal connectors 12 and 14 of identical elongate and generally cylindrical configuration disposed within a cylindrical insulator block 16 comprising upper and lower sections 16A and 16B of substantially similar cross section, the sections being molded individually for convenience and then permanently bonded together. Insulator block has formed therein four longitudinally extending and parallel passages 18, 20, 22, and 24. On the upper end of the device 10 as seen in FIG. 1, the passages 18, 20, 22, and 24 communicate with an enlarged cylindrical end opening 26 of relatively thin wall section, the individual passages 20 and 24 being conjoined with the opening 26 by means of tapering passage portions 28 and 30 which are representative of the similar configured portions in the other passages as is evident from the end view of FIG. 2. Similar tapering passage portions 31 and 32 are found at the lower end of the device 10 as shown in FIG. 1 to facilitate insertion of the metallic connector elements 12 and 14 thereinto as hereinafter described in detail.

Figure 3:
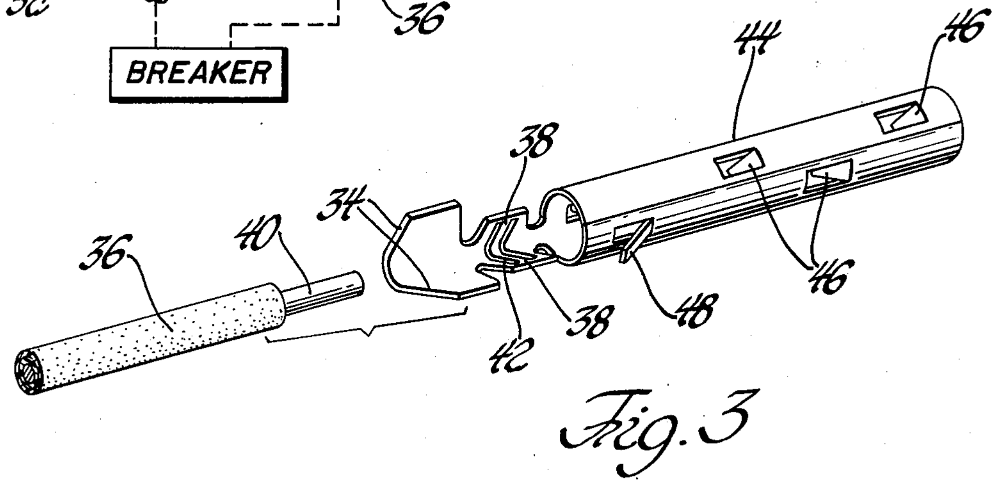
FIG. 3 is a perspective view of the illustrative connector removed from the insulator block prior to a wire crimping operation.

The four parallel connector elements which are disposed in the insulator block 16 of the device 10 are all identical and connector device 12 is shown in FIG. 3 as being representative. Connector device 12 is preferably stamped out of a sheet of conductive metal and rolled into the configuration shown in FIG. 3. In this configuration the connector device 12 is provided at one end with a pair of large deformable metal ears 34 which are adapted to be crimped around the insulation 36 of a solid-wire conductor 40. Connector device 12 is also provided with an integral pair of smaller ears 38 which are adapted to be deformed, such as by crimping, around the bare wire portion of conductor 40 as shown in FIGS. 1 and 3 to provide a secure connection between the connector 12 and the wire 40. Ribs 42 may be formed internally of the portion of connector device 12 adjacent the small ears 38, as shown in FIG. 3, to provide additional mechanical securement between the connector 12 and the wire 40. It is by way of the mechanical deformation of the ears 34 and 38 around the previously stripped wire 40 that the first half of the electrical joint or splice to be accomplished in accordance with the present invention is carried out.

The balance of the connector 12 is rolled into the shape of a barrel 44 to provide a plug-in terminal portion for a bare solid-wire conductor so as to permit that conductor to be readily plugged into the device 10 and secured therein against subsequent removal so as to complete the electrical splice or joint in accordance with the invention. The tubular portion 44 of the connector 12 extends to the end thereof opposite the ears 34 and is provided with a plurality of locking tabs or barbs 46 which are struck from the body of the tubular portion 44 and bent thereinto, all in the same direction, so as to facilitate the insertion of a bare copper wire but to act as unidirectional friction locks so as to prevent the removal thereof. Accordingly, when a second wire is inserted into any one of the connectors 12 or 14, a conductive joint is immediately accomplished, this joint being both expeditiously accomplished as well as substantially permanent and secure in its assembly.

The connector 12 is shown to include a pair of spring-lock tabs 48 which are struck from the tubular body 44 thereof near the ears 38 so as to coact with the internal shoulder 50 of passage 20 to prevent the removal of the connector device 12 from the passage 20 once it has been inserted therein. Shoulder 50 is a consequence of the fact that the passage portion in insulator block section 16B is slightly smaller in diameter than that of insulator block section 16A as is evident from the cross sectional view of FIG. 1. Shoulder 52 formed at the opposite end of the passage, that is, in the upper insulator block section 16A, prevents the further axial displacement of the connector 12 within the passage 20. Accordingly, once the connectors 12 and 14 are inserted, they are locked in place against any significant axial movement.

In practice, a suitable connector 12 for use with No. 12 solid copper wire measures approximately 1¼ inches in length, with the tubular body 44 being approximately 70% of the overall length to ensure adequate locking force and depth of insertion. The depth of end opening 26 may be on the order of ⅜ inch to accommodate the heavily jacketed portion of the multi-conductor cable to be connected. The interior diameter of tubular barrel 44 may be on the order of 7/64 inch exclusive of the tabs 46, and 0.050 inch in diameter within the tabs. These dimensions are preferred but only illustrative.

Figure 2:
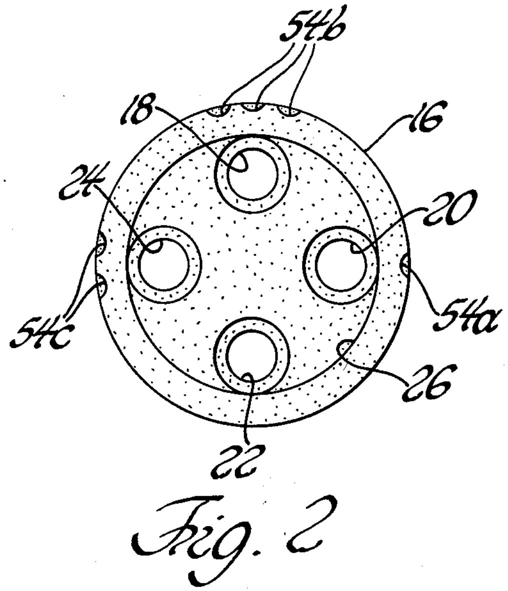
FIG. 2 is an end view of the device of FIG. 1.

As shown in FIGS. 1 and 2, the upper section 16A of the insulative block 16 is provided around the outer periphery thereof with coded tactile indicia in the form of grooves 54A, 54B, and 54C of which groove 54A is immediately adjacent the channel 20, triple grooves 54B are immediately adjacent the channel 18, and double grooves 54C are immediately adjacent the channel 24. The surface of the connector block section 16A adjacent the channel 22 is smooth and, thus, by visual observation or tactile response one can easily determine the coding for the separate wires of the four-conductor ROMEX which is to be connected into any given device 10. Indicia other than grooves can, of course, be employed; for example, it is also possible to use raised dots, colors, etc.

As shown in FIG. 1, the outer diameter of the lower insulator block section 16B is larger than that of the upper block 16A to define a shoulder 55 and is undercut or reduced in diameter immediately adjacent the upper end thereof; that is, the end which abuts and is permanently secured to the mating end of the upper insulator block section 16A, as shown in FIG. 1. This defines a peripheral groove 56 which is adapted to receive a U-shaped metal clip 57 to maintain the device 10 securely in an aperture in panel 58 which forms part of an electrical circuit breaker housing. When properly in place, the shoulder 55 abuts the lower surface of the panel 58 and the clip 56 abuts the upper surface of the panel to prevent device 10 from moving longitudinally relative to the panel. Note that the diameter of the upper block 16A is such as to readily fit through the aperture to permit the device 10 to be inserted.

A representative and preferred use of the devices 10 will now be described.

Panel 58 represents the upper surface of a conventional circuit breaker box carrying therein a plurality of individual circuit breakers of conventional design. In accordance with the invention, the plurality of connector devices 10 are suitably secured to the rigid panel 58 of the circuit breaker housing while in the factory or at some intermediate stage and are prewired to the individual circuit breakers such that when the circuit breaker panel is installed at the use site, it remains only to finish the wiring to the panel by plugging in the external ROMEX cables to individual connector devices 10. This is accomplished by connecting the multiple conductor, solid-wire ROMEX portions between the circuit breakers and the connectors 12 and 14, the connection to the circuit breaker being accomplished in the conventional fashion according to the design of the particular circuit breaker and the connections to the connectors 12 and 14 being accomplished by the insulation stripping and ear crimping operation previously described. At this point the connectors 12 and 14 are inserted into the channels 20 and 24, respectively, by way of the flared openings 31 and 32, respectively.

The connectors 12 and 14 are thrust into the insulator block 16 until the spring-lock tabs 48 pass over the shoulder 50 and spring out, thus, holding the connectors in place. The wiring between a given circuit breaker and a given external circuit is then completed simply by stripping the wires of the ROMEX cable representing the external circuit and thrusting the bared wires down into the channels 20 and 24 by way of the cylindrical opening 26. The individual wires are positioned according to the indicator grooves 54.

It is to be understood that the invention has been described with reference to a specific embodiment thereof and that various changes and modifications will be apparent to those skilled in the art.

The embodiments of the invention in which an exclusive property or privilege is claimed are defined as follows:

1. Electrical apparatus for facilitating the wiring of electrical circuit breaker panels comprising: a housing including an electrical circuit breaker, said housing having at least one rigid panel with an aperture formed therein, an insulative block secured within said aperture and carried by said panel and having a tubular passage extending therethrough and having one end within said housing, and another end accessible from outside said housing, a one-piece conductive connector securely disposed within said passage of said block and comprising a tubular body coaxial with said passage for receiving a stripped, solid conductor wire, electrical wiring extending from said circuit breaker to the connector through said one end of said passage and being substantially permanently electrically connected thereto; said one-piece connector having securing means adjacent the other end receiving and non-removably securing external bare-end electrical wiring and completing a circuit from said breaker to said external wiring, said securing means including inwardly projecting barbs formed in said tubular body for permitting insertion of a bare-end, solid conductor wire from said other end and operative on said wire to prevent subsequent removal thereof, said conductive connector being recessed inwardly from said other end of the insulative block, and the portion of the passage immediately adjacent said other end being of larger diameter than the one-piece connector whereby the connector holds said bare-end electrical wiring and said larger diameter portion of said passage accommodates insulation on said electrical wiring spaced away from said bare-end portion to permit said electrical wiring to be jammed into the connector and passage.

2. Apparatus as defined in claim 1 wherein said block has a plurality of said passages in parallel therein, and similar connectors in each of said passages.

3. Apparatus as defined in claim 2 including indicator means formed on said block external to said housing and adjacent said passages for individually distinguishing the passages from one another.

* * * * *